United States Patent
Ito

(10) Patent No.: US 11,767,423 B2
(45) Date of Patent: Sep. 26, 2023

(54) ANTIMICROBIAL FIBERS

(71) Applicant: MITSUBISHI GAS CHEMICAL COMPANY, INC., Tokyo (JP)

(72) Inventor: Akira Ito, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 1050 days.

(21) Appl. No.: 16/567,779

(22) Filed: Sep. 11, 2019

(65) Prior Publication Data

US 2020/0002853 A1 Jan. 2, 2020

Related U.S. Application Data

(63) Continuation of application No. 15/554,309, filed as application No. PCT/JP2016/057513 on Mar. 10, 2016, now abandoned.

(30) Foreign Application Priority Data

Mar. 18, 2015 (JP) ................................. 2015-054267

(51) Int. Cl.
*D01D 5/098* (2006.01)
*D01D 5/12* (2006.01)
*D01D 5/16* (2006.01)
*D01D 5/34* (2006.01)
*D01F 8/04* (2006.01)
*D01F 8/06* (2006.01)
*D01F 8/12* (2006.01)
*D01F 8/14* (2006.01)
*C08L 59/04* (2006.01)
*C08G 2/22* (2006.01)
*D04B 21/00* (2006.01)
*D04B 1/16* (2006.01)
*D01F 6/66* (2006.01)
*D01F 8/16* (2006.01)
*D04H 1/4326* (2012.01)
*D03D 15/50* (2021.01)
*D03D 15/283* (2021.01)
*D01F 6/78* (2006.01)
*D01D 5/08* (2006.01)
(Continued)

(52) U.S. Cl.
CPC .............. *C08L 59/04* (2013.01); *A41D 31/00* (2013.01); *C08G 2/22* (2013.01); *D01D 5/08* (2013.01); *D01D 5/0985* (2013.01); *D01F 6/14* (2013.01); *D01F 6/66* (2013.01); *D01F 6/78* (2013.01); *D01F 8/16* (2013.01); *D03D 15/283* (2021.01); *D03D 15/50* (2021.01); *D04B 1/16* (2013.01); *D04B 21/00* (2013.01); *D04H 1/4326* (2013.01); *A41B 1/08* (2013.01); *A41B 11/00* (2013.01); *A41B 11/14* (2013.01); *A41B 15/00* (2013.01); *A41B 17/00* (2013.01); *A41B 2400/34* (2013.01); *A41B 2500/10* (2013.01); *A41B 2500/20* (2013.01); *A41B 2500/30* (2013.01); *A41D 13/04* (2013.01); *A41D 19/00* (2013.01); *A41D 23/00* (2013.01); *A41D 25/00* (2013.01); *A41D 31/30* (2019.02); *A41D 2600/10* (2013.01); *A47G 9/0238* (2013.01); *A63H 3/02* (2013.01); *D10B 2321/06* (2013.01); *D10B 2501/02* (2013.01); *D10B 2501/021* (2013.01); *D10B 2501/04* (2013.01); *D10B 2501/041* (2013.01); *D10B 2501/042* (2013.01); *D10B 2501/045* (2013.01); *D10B 2503/02* (2013.01); *D10B 2503/04* (2013.01); *D10B 2503/06* (2013.01); *D10B 2505/04* (2013.01)

(58) Field of Classification Search
CPC ........ D01D 5/08; D01D 5/098; D01D 5/0985; D01D 5/12; D01D 5/16; D01D 5/34; D01F 6/14; D01F 8/04; D01F 8/06; D01F 8/12; D01F 8/14; D01F 8/16; D10B 2321/06; D10B 2501/02; D10B 2501/021; D10B 2501/04; D10B 2501/041; D10B 2501/042; D10B 2501/045; D10B 2503/02; D10B 2503/04; D10B 2503/06; D10B 2505/04
USPC ...... 264/103, 172.15, 172.17, 172.18, 210.8, 264/331.11
See application file for complete search history.

(56) References Cited

U.S. PATENT DOCUMENTS

| | | | |
|---|---|---|---|
| 5,478,563 A | 12/1995 | Erami | |
| 2004/0175566 A1* | 9/2004 | Kikutani | ................ D01D 5/084 428/393 |

(Continued)

FOREIGN PATENT DOCUMENTS

| | | |
|---|---|---|
| EP | 1321546 | 6/2003 |
| JP | 05-230325 | 9/1993 |

(Continued)

OTHER PUBLICATIONS

Translation of JP 2006328322 A (published on Dec. 7, 2006).*
(Continued)

*Primary Examiner* — Leo B Tentoni
(74) *Attorney, Agent, or Firm* — GREENBLUM AND BERNSTEIN, P.L.C.

(57) ABSTRACT

The invention provides an antimicrobial fiber which exhibits excellent antimicrobial properties even without the addition of antimicrobial agents and can remain antimicrobial even after repeated washing. The antimicrobial fiber comprises a fiber having on a surface thereof a polyacetal copolymer (X) containing oxyalkylene groups, the molar amount of oxyalkylene groups in the polyacetal copolymer (X) being 0.2 to 5 mol % relative to the total of the molar amount of oxymethylene groups and the molar amount of oxyalkylene groups.

19 Claims, No Drawings

(51) Int. Cl.
*D01F 6/14* (2006.01)
*A41D 31/00* (2019.01)
*A41D 31/30* (2019.01)
*A41B 1/08* (2006.01)
*A41B 11/00* (2006.01)
*A41B 11/14* (2006.01)
*A41B 15/00* (2006.01)
*A41B 17/00* (2006.01)
*A41D 13/04* (2006.01)
*A41D 19/00* (2006.01)
*A41D 23/00* (2006.01)
*A41D 25/00* (2006.01)
*A47G 9/02* (2006.01)
*A63H 3/02* (2006.01)

(56) References Cited

U.S. PATENT DOCUMENTS

| | | | |
|---|---|---|---|
| 2010/0190406 A1 | 7/2010 | Usui et al. | |
| 2011/0171868 A1 | 7/2011 | Okamura et al. | |
| 2015/0147506 A1* | 5/2015 | Korzhenko | B29C 48/45 |
| | | | 524/584 |

FOREIGN PATENT DOCUMENTS

| | | | | |
|---|---|---|---|---|
| JP | 08-144128 | 6/1996 | | |
| JP | 9-291193 | 11/1997 | | |
| JP | 10-265585 | 10/1998 | | |
| JP | 2003-268627 | 9/2003 | | |
| JP | 2004-360146 | 12/2004 | | |
| JP | 2005-013829 | 1/2005 | | |
| JP | 2006-009205 | 1/2006 | | |
| JP | 2006328322 A | * 12/2006 | | C08L 67/04 |
| JP | 2007277757 A | * 10/2007 | | D01F 6/66 |
| JP | 2008-138331 | 6/2008 | | |
| JP | 2008-163505 | 7/2008 | | |
| WO | 2009/011346 | 1/2009 | | |
| WO | 2009/145193 | 12/2009 | | |

OTHER PUBLICATIONS

Translation of JP 2007277757 A (published on Oct. 25, 2007).*
ISR issued in Patent Application No. PCT/JP2016/057513, dated Jun. 14, 2016.
European Search Report issued with respect to European Application No. 16764828.6, dated Sep. 25, 2018.
IPRP issued in Patent Application No. PCT/JP2016/057513, dated Sep. 19, 2017.

* cited by examiner

ANTIMICROBIAL FIBERS

CROSS REFERENCE PARAGRAPH

The present application is a Continuation of U.S. application Ser. No. 15/554,309 (now abandoned), filed Aug. 29, 2017, which is a National stage of International Patent Application No. PCT/JP2016/057513, filed Mar. 10, 2016, which claims priority to Japanese Application No. 2015-054267, filed Mar. 18, 2015; the disclosure of each of these applications is expressly incorporated by reference herein in their entireties.

FIELD OF THE INVENTION

The present invention relates to an antimicrobial fiber having a polyacetal copolymer on its surface. The invention also relates to a nonwoven fabric, a knitted fabric, a woven fabric, a felt and a web which each include the antimicrobial fiber. Further, the invention relates to a filter including the nonwoven fabric, and to a clothing article, a bedding article or an interior article including any one or more selected from the group consisting of the knitted fabrics, the woven fabrics, the felts and the webs.

BACKGROUND ART

Polyacetal is an engineering plastic with excellent mechanical properties, heat resistance, chemical resistance and electrical characteristics, and is widely used in fields such as electric appliances, automobiles, machinery and building materials. Further, polyacetal is easy to fabricate into articles and is used as fibers, nonwoven fabrics and filters (see, for example, Patent Literatures 1 to 3).

With the social development, plastics have been increasingly required to be resistant to microbes (to have antimicrobial properties) in addition to having the properties described above. Because of their nature as dielectric materials or electrically insulating materials, however, plastics are prone to attract airborne dusts and microbes and tend to allow microbes to grow on their surfaces if the temperature and humidity conditions are appropriate. The growth of microbes deteriorates the appearance and causes a bad odor, and microbes contaminate objects that have touched them. For example, *Moraxella osloensis* is known to be the cause of 4-methyl-3-hexenoic acid which is responsible for the rag-like smell of washed clothes.

A known approach to improving the antimicrobial properties of plastics is to knead into the plastics an organic antimicrobial agent such as 2-(4-thiazolyl)-benzimidazole (thiabendazole) or an inorganic antimicrobial agent such as a substance containing metal ions, for example, silver, copper or zinc ions, or to coat the surface of plastic articles with such an organic antimicrobial agent or inorganic antimicrobial agent (see, for example, Patent Literatures 4 and 5).

Methods which improve antimicrobial properties are also presented for polyacetal. For example, Patent Literature 4 discloses a resin composition in which a metal ion-containing substance such as zinc benzoate, zinc sulfate or zinc oxide is melt-kneaded into polyacetal. Patent Literature 5 discloses a resin composition in which a poly-β-alanine polymer and an inorganic antimicrobial zeolite are melt-kneaded into polyacetal. Further, Patent Literature 6 discloses a resin composition in which a specific hindered amine substance such as dimethyl succinate•1-(2-hydroxyethyl)-4-hydroxy-2,2,6,6-tetramethylpiperidine polycondensate is melt-kneaded into polyacetal.

PRIOR ART DOCUMENTS

Patent Documents

Patent Literature 1: Japanese Patent Laid-Open No. 2008-163505
Patent Literature 2: Japanese Patent Laid-Open No. 2004-360146
Patent Literature 3: Japanese Patent Laid-Open No. 2005-13829
Patent Literature 4: Japanese Patent Laid-Open No. H5-230325
Patent Literature 5: Japanese Patent Laid-Open No. H9-291193
Patent Literature 6: Japanese Patent Laid-Open No. H10-265585

SUMMARY OF THE INVENTION

Problems to be Solved by the Invention

Organic antimicrobial agents frequently have problems in terms of aspects such as appearance, heat resistance, safety (for example, carcinogenicity and atopicity) and resin affinity. For example, the aforementioned thiabendazole, when mixed with plastics, shows a very high tendency to bleed out and thus cannot be expected to provide persistent antimicrobial effects (antimicrobial properties). Further, it is known that bleeding causes problems such as the surface of articles being white bloomy or the surface of articles being sticky. From the safety viewpoint, it is known that the compound is carcinogenic. Furthermore, organic antimicrobial agents have another problem in that they are easily decomposed by heat when being melt-kneaded with plastic materials (see, for example, Patent Literature 4).

On the other hand, some problems encountered with inorganic antimicrobial agents are that the antimicrobial agents need to be added in large amounts (for example, 1 to 2 wt %) to plastics in order to provide antimicrobial effects, that the antimicrobial agents are detached from plastics due to friction or the like to fail to provide persistent effects, and that the antimicrobial agents are dissolved by contact with water and solvents.

An object of the present invention is to provide an antimicrobial fiber which has excellent antimicrobial properties and can remain antimicrobial even after repeated washing. Another object is to provide a nonwoven fabric, a knitted fabric, a woven fabric, a felt and a web which each include the antimicrobial fiber described above and exhibit excellent antimicrobial properties. A further object of the invention is to provide a filter including the nonwoven fabric, and a clothing article, a bedding article or an interior article which includes any one or more selected from the group consisting of the knitted fabrics, the woven fabrics, the felts and the webs.

Means for Solving the Problems

As a result of extensive studies on the problems discussed above, the present inventor has found that a fiber which has on its surface a polyacetal copolymer containing a specific amount of oxyalkylene groups attains excellent antimicrobial properties and remains antimicrobial even after repeated washing, thus completing the present invention.

Specifically, the present invention pertains to the following.

(1) An antimicrobial fiber including a fiber having a polyacetal copolymer (X) on a surface thereof, the polyacetal copolymer (X) having oxymethylene groups and oxyalkylene groups of the following general formula (1), the molar amount of the oxyalkylene groups in the polyacetal copolymer (X) being 0.2 to 5 mol % relative to the total of the molar amount of the oxymethylene groups and the molar amount of the oxyalkylene groups,

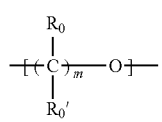
(1)

wherein $R_0$ and $R_0'$, which may be the same as or different from each other, are each selected from a hydrogen atom, a $C_{1-8}$ alkyl group, an organic group having a $C_{1-8}$ alkyl group, a phenyl group and an organic group having a phenyl group, and m is an integer of 2 to 6.

(2) The antimicrobial fiber described in (1), wherein the orientation factor of the polyacetal copolymer (X) is not less than 60%.

(3) The antimicrobial fiber described in (1) or (2), wherein the fiber having the polyacetal copolymer (X) on a surface thereof is a monolayer fiber of the polyacetal copolymer (X).

(4) The antimicrobial fiber described in (1) or (2), wherein the fiber having the polyacetal copolymer (X) on a surface thereof is a multilayer fiber having a coating of the polyacetal copolymer (X) on a fiber including a thermoplastic resin.

(5) The antimicrobial fiber described in (1) or (2), wherein the fiber having the polyacetal copolymer (X) on a surface thereof is a conjugate fiber having the polyacetal copolymer (X) on a surface of a fiber including a thermoplastic resin.

(6) The antimicrobial fiber described in (4) or (5), wherein the thermoplastic resin is one or more selected from polyacetal homopolymers, polyacetal copolymers other than the polyacetal copolymer (X), polyolefin resins, polylactic acid resins, nylon resins, polyester resins, polyvinyl resins and elastomers of these resins.

(7) A nonwoven fabric including the antimicrobial fiber described in any one of (1) to (6).

(8) A filter including the nonwoven fabric described in (7).

(9) A knitted fabric including the antimicrobial fiber described in any one of (1) to (6).

(10) A woven fabric including the antimicrobial fiber described in any one of (1) to (6).

(11) A felt including the antimicrobial fiber described in any one of (1) to (6).

(12) A web including the antimicrobial fiber described in any one of (1) to (6).

(13) A clothing article including one or more selected from the group consisting of the knitted fabrics, the woven fabrics, the felts and the webs described in (9) to (12).

(14) A bedding article including one or more selected from the group consisting of the knitted fabrics, the woven fabrics, the felts and the webs described in (9) to (12).

(15) An interior article including one or more selected from the group consisting of the knitted fabrics, the woven fabrics, the felts and the webs described in (9) to (12).

Effects of Invention

According to the present invention, an antimicrobial fiber can be provided which has excellent antimicrobial properties and can remain antimicrobial even after repeated washing. The antimicrobial fiber of the invention can be fabricated into a nonwoven fabric, a knitted fabric, a woven fabric, a felt and a web which exhibit excellent antimicrobial properties. Thus, the invention can provide a filter, a clothing article, a bedding article and an interior article which each include any of the above fabricated products and have excellent antimicrobial properties.

EMBODIMENTS TO CARRY OUT THE INVENTION

⟨Antimicrobial Fibers⟩

The present invention will be described in detail hereinbelow. An aspect of the invention resides in an antimicrobial fiber which comprises a fiber having a polyacetal copolymer (X) on a surface thereof. The polyacetal copolymer (X) has oxymethylene groups and oxyalkylene groups of the general formula (1) described later. The molar amount of the oxyalkylene groups in the polyacetal copolymer (X) is 0.2 to 5 mol % relative to the total of the molar amount of the oxymethylene groups and the molar amount of the oxyalkylene groups. That is, the antimicrobial fiber of the invention is characterized in that the fiber has on a surface thereof a polyacetal copolymer (X) which contains 0.2 to 5 mol % of oxyalkylene groups of the general formula (1) described later relative to the total of the molar amount of oxymethylene groups and the molar amount of oxyalkylene groups.

The antimicrobial fiber of the invention is a fiber having the polyacetal copolymer (X) on a surface thereof. The fiber may have the polyacetal copolymer (X) on a surface thereof in any configuration without limitation. Preferably, the fiber is [A] a monolayer fiber of the polyacetal copolymer (X), [B] a multilayer fiber having a coating of the polyacetal copolymer (X) on a fiber comprising a thermoplastic resin, or [C] a conjugate fiber having the polyacetal copolymer (X) on a surface of a fiber comprising a thermoplastic resin.

The monolayer fiber [A] of the polyacetal copolymer (X) is a fiber comprising the polyacetal copolymer (X). The monolayer fiber may be obtained by melt-spinning the polyacetal copolymer (X) and optionally drawing the fiber as required.

In the multilayer fiber [B] having a coating of the polyacetal copolymer (X) on a surface, the core may be a fiber comprising a thermoplastic resin. The type of the thermoplastic resin is not particularly limited. Examples of the thermoplastic resin include polyacetal homopolymers, polyacetal copolymers other than the polyacetal copolymer (X) (for example, polyacetal copolymers containing more than 5 mol % of oxyalkylene groups of the general formula (1) relative to the total of the molar amount of oxymethylene groups and the molar amount of oxyalkylene groups), polyolefin resins, polylactic acid resins, nylon resins, polyester resins, polyvinyl resins and elastomers of these resins. These thermoplastic resins may be used singly, or two or more may be used as a stack or a compatibilized resin. The term "coating" used in the present invention means that the entirety or a portion of the surface of the core fiber parallel to the fiber direction is covered. The proportion of the coating on the surface is not particularly limited, but a higher proportion is more preferable because excellent antimicrobial properties are attained.

The multilayer fiber may be obtained by melt-spinning the polyacetal copolymer (X) and the aforementioned thermoplastic resin and optionally drawing the fiber as required. The resultant multilayer fiber has a sheath-core structure in which the polyacetal copolymer (X) covers the entirety or a portion of the periphery of a fiber comprising the thermoplastic resin as the core fiber.

In the conjugate fiber [C] having the polyacetal copolymer (X) on a surface of a fiber comprising a thermoplastic resin, the type of the thermoplastic resin is not particularly limited and may be similar to the thermoplastic resin in the multilayer fiber configuration described above. The thermoplastic resins may be used singly, or two or more may be used as a stack or a compatibilized resin.

The conjugate fiber having the polyacetal copolymer (X) on a surface of a fiber comprising a thermoplastic resin may be obtained by melt-spinning a mixture of the polyacetal copolymer (X) and the aforementioned thermoplastic resin, and optionally drawing the fiber as required. The resultant conjugate fiber may be such that the polyacetal copolymer (X) is exposed on the fiber surface on the polymer molecular level by being compatibilized with the thermoplastic resin, or such that the polyacetal copolymer (X) is exposed on the fiber surface while forming an islands-sea structure or other dispersed phases derived from such a structure, or such that the polyacetal copolymer (X) and the thermoplastic resin are exposed on the surface side by side. The proportion in which the polyacetal copolymer (X) is exposed on the surface of the conjugate fiber is not particularly limited, but a higher proportion is more preferable because excellent antimicrobial properties are attained.

In the antimicrobial fiber of the invention, the orientation factor of the polyacetal copolymer (X) is not particularly limited, but is preferably not less than 60%, more preferably not less than 70%, and particularly preferably not less than 80%. The reason for this preference is that the antimicrobial properties are enhanced with increasing orientation factor of the polyacetal copolymer (X). As will be described later, the antimicrobial properties of the polyacetal copolymer (X) are correlated with the amount of oxyalkylene groups contained in the copolymer, and the polyacetal copolymer (X) tends to decrease its antimicrobial properties as the content of oxyalkylene groups is increased. However, the orientation factor comes to have a greater impact on the antimicrobial properties as the content of oxyalkylene groups in the polyacetal copolymer (X) is higher. Because of this characteristic, a higher orientation factor provides higher antimicrobial properties when the polyacetal copolymer (X) has a high content of oxyalkylene groups. The orientation factor of the polyacetal copolymer (X) may be efficiently increased by drawing the fiber that has been melt-spun.

The orientation factor of the antimicrobial fiber may be determined using a wide angle X-ray diffractometer as will be described in Examples in the present specification.

The acceptable monofilament fineness of the antimicrobial fiber of the invention is variable depending on the purpose of use, and thus the monofilament fineness is not particularly limited. When the fiber is used as a filter, the fineness is preferably not more than 10 dtex (unit: decitex) because of the need of increasing the filtration accuracy while reducing the pressure loss of the fluid.

In the case of Staphylococcus aureus known as a bacterium responsible for food poisoning, the bacteriostatic activity of the antimicrobial fiber of the invention, as measured by an antimicrobial test in accordance with JIS L 1902 (Testing for antibacterial activity and efficacy on textile products) is usually not less than 2.2, preferably not less than 2.4, and particularly preferably not less than 2.7. This activity value qualifies for the certification as being antimicrobial and deodorant finished that is established by Japan Textile Evaluation Technology Council. The antimicrobial fiber of the invention is also characterized by its high bactericidal activity on Staphylococcus aureus. Another outstanding characteristic is that such antimicrobial properties persist even after repeated washing as compared to antimicrobial fibers obtained by kneading antimicrobial substances into polyacetal fibers.

The antimicrobial fiber of the invention exhibits high bacteriostatic activity also on Moraxella osloensis which causes a bad smell. The bacteriostatic activity on Moraxella osloensis is usually not less than 1.8, preferably not less than 2.0, and particularly preferably not less than 2.2. The antimicrobial fiber of the invention is also characterized by its high bactericidal activity on Moraxella osloensis. Another outstanding characteristic is that such antimicrobial properties persist even after repeated washing as compared to antimicrobial fibers obtained by kneading antimicrobial substances into polyacetal fibers.

⟨Methods for Producing Antimicrobial Fibers⟩

The antimicrobial fiber of the invention may be produced by a known fiber production method. For example, the fiber may be produced by melt-spinning, for example, pellets of the polyacetal copolymer (X). During the production, it is preferable to draw the fiber that has been melt-spun so as to increase the orientation factor described hereinabove. The drawing may be performed by a known method under known conditions. The draw ratio is preferably 3 times or more from the point of view of orientation factor. The upper limit of the draw ratio is not limited from the point of view of orientation factor, but is 15 times to ensure stability during production (to prevent filament breakage) and to prevent excessive fibril formation. The apparatuses for melt-spinning and drawing may be conventional apparatuses.

⟨Polyacetal Copolymers (X)⟩

The polyacetal copolymer (X) present on a surface of the antimicrobial fiber of the invention has, in the molecule, oxymethylene groups (—CH$_2$—O—) and oxyalkylene groups having a structure of the following general formula (1):

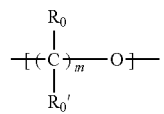
(1)

In the formula, R$_0$ and R$_0$', which may be the same as or different from each other, are each selected from a hydrogen atom, a C$_{1-8}$ alkyl group, an organic group having a C$_{1-8}$ alkyl group, a phenyl group and an organic group having a phenyl group. The letter m is an integer of 2 to 6. Preferably, R$_0$ and R$_0$' may be the same as or different from each other and are each selected from a hydrogen atom, a C$_{1-4}$ alkyl group, a C$_{1-4}$ alkoxy group, a phenyl group and a benzyl group, and m is an integer of 2 to 4. More preferably, R$_0$ and R$_0$' are each selected from a hydrogen atom and a C$_{1-4}$ alkyl group, and m is 2.

Examples of the $C_{1-8}$ alkyl groups include methyl group, ethyl group, propyl group, isopropyl group, butyl group, isobutyl group, pentyl group, hexyl group and cyclohexyl group. Examples of the organic groups having a $C_{1-8}$ alkyl group include methoxy group, ethoxy group, propoxy group, isopropoxy group and butoxy group. Examples of the organic groups having a phenyl group include benzyl group and phenethyl group.

Preferred oxyalkylene groups are oxyethylene groups, oxypropylene groups and oxybutylene groups. Oxyethylene groups are particularly preferable.

A single kind, or two or more kinds of the oxyalkylene groups may be present in the polyacetal copolymer (X). That is, the polyacetal copolymer (X) of the invention may be a binary copolymer or a multicomponent copolymer.

The polyacetal copolymer (X) of the invention may be a polyacetal copolymer which further has a block structure other than the oxymethylene groups and the oxyalkylene groups, or may be a polyacetal copolymer which further has a branch structure in the molecule. Examples of such polyacetal copolymers include a polyacetal copolymer which is obtained using as a chain transfer agent a thermoplastic resin or an oligomer that has an active hydrogen-containing functional group such as a hydroxyl group at a molecular end or within the molecule and which has the structure of the chain transfer agent introduced at a molecular end; and a polyacetal copolymer which is obtained by polymerization reaction in the presence of a compound that contains, in the main chain, a copolymerizable cyclic formal moiety such as polyvinyl formal.

The polyacetal copolymer (X) of the invention may be one produced using a termonomer such as an epoxy compound, for example, glycidyl ether, or allyl ether, or the polyacetal copolymer may have a structure derived from such a compound.

The range of the content of oxyalkylene groups (the molar amount of oxyalkylene groups) in general polyacetal copolymers is as wide as from 0.01 to 20 mol % relative to the total of the molar amount of oxymethylene groups and the molar amount of oxyalkylene groups. In contrast, the content of oxyalkylene groups (the molar amount of oxyalkylene groups) in the inventive polyacetal copolymer (X) is usually 0.2 to 5 mol % relative to the total of the molar amount of oxymethylene groups and the molar amount of oxyalkylene groups, and is preferably 0.2 to 3.0 mol %, more preferably 0.2 to 2.0 mol %, and particularly preferably 0.2 to 1.0 mol %. When the content of oxyalkylene groups is not less than 0.2 mol % and not more than 5 mol %, the copolymer attains excellent antimicrobial properties and exhibits high bacteriostatic activity which shows antimicrobial properties, and is resistant to a decrease in bacteriostatic activity even when subjected to repeated washing. When the content of oxyalkylene groups is not less than 0.2 mol % and not more than 3.0 mol %, the copolymer attains higher antimicrobial properties and exhibits higher bacteriostatic activity which shows antimicrobial properties, and is more resistant to a decrease in bacteriostatic activity even when subjected to repeated washing.

The polyacetal copolymer (X) of the invention that is used may be a single such copolymer or may be a combination of two or more polyacetal copolymers having different kinds of oxyalkylene groups or a combination of two or more polyacetal copolymers having different contents of oxyalkylene groups. When two or more polyacetal copolymers having different kinds of oxyalkylene groups or different contents of oxyalkylene groups are used in combination, these polyacetal copolymers may be in the compatibilized state, may form an islands-sea structure or other dispersed phases derived from such a structure, or may have a side-by-side configuration or the like.

The polyacetal copolymer (X) of the invention preferably has an MVR (melt volume rate) in accordance with ISO 1133 of not more than 100 $cm^3/10$ min. While a higher MVR value is more suited for the production of fine fibers by melt-spinning, 100 $cm^3/10$ min or less melt volume rate ensures that the obtainable fiber attains excellent mechanical properties (in particular, toughness).

⟨Methods for Producing Polyacetal Copolymers (X)⟩

The polyacetal copolymer (X) of the invention may be produced by any method that is known and conventional. For example, a polyacetal resin having oxymethylene groups and $C_{2-4}$ oxyalkylene groups as structural units may be produced by copolymerizing a cyclic acetal formed by oxymethylene groups such as formaldehyde trimer (trioxane) or tetramer (tetraoxane), with a cyclic acetal containing a $C_{2-4}$ oxyalkylene group such as ethylene oxide, 1,3-dioxolane, 1,3,6-trioxocane or 1,3-dioxepane. In particular, the polyacetal copolymer (X) of the invention is preferably a copolymer of a cyclic acetal such as trioxane or tetraoxane, and ethylene oxide or 1,3-dioxolane, and is particularly preferably a copolymer of trioxane and 1,3-dioxolane.

For example, the polyacetal copolymer (X) of the invention may be obtained by bulk polymerization of a cyclic acetal formed by oxymethylene groups with a cyclic acetal comonomer containing a $C_{2-4}$ oxyalkylene group in the presence of a polymerization catalyst. A reaction terminator may be used as required to deactivate the polymerization catalyst and the growing ends of the polymer. Further, a molecular weight modifier may be used as required to control the molecular weight of the polyacetal copolymer. The types and amounts of the polymerization catalyst, the reaction terminator and the molecular weight modifier which may be used in the production of the polyacetal copolymer (X) of the invention are not particularly limited as long as the advantageous effects of the invention are not impaired. Any known polymerization catalysts, reaction terminators and molecular weight modifiers may be used appropriately.

The polymerization catalysts are not particularly limited. Examples thereof include Lewis acids such as boron trifluoride, tin tetrachloride, titanium tetrachloride, phosphorus pentachloride, phosphorus pentafluoride, arsenic pentafluoride and antimony pentafluoride, and complex compounds or salt compounds of these Lewis acids. Examples further include protonic acids such as trifluoromethanesulfonic acid and perchloric acid; protonic acid esters such as esters of perchloric acid with lower aliphatic alcohols; and protonic acid anhydrides such as mixed anhydrides of perchloric acid with lower aliphatic carboxylic acids. Examples further include triethyloxonium hexafluorophosphate, triphenylmethyl hexafluoroarsenate, acetyl hexafluoroborate, heteropoly acids or acidic salts thereof, isopoly acids or acidic salts thereof, and perfluoroalkylsulfonic acids or acidic salts thereof. In particular, compounds containing boron trifluoride are preferable, and coordination complexes thereof with ethers, specifically, boron trifluoride diethyl etherate and boron trifluoride dibutyl etherate are particularly preferable.

The amount of the polymerization catalyst is not particularly limited, but is usually in the range of $1.0 \times 10^{-8}$ to $2.0 \times 10^{-3}$ mol per 1 mol of all the monomers including trioxane and comonomer(s), and is preferably $5.0 \times 10^{-8}$ to $8.0 \times 10^{-4}$ mol, and particularly preferably $5.0 \times 10^{-8}$ to $1.0 \times 10^{-4}$ mol.

The reaction terminator is not particularly limited. Examples thereof include trivalent organic phosphorus compounds, amine compounds, and hydroxides of alkali metals or alkaline earth metals. These reaction terminators may be used singly, or two or more may be used in combination. In particular, trivalent organic phosphorus compounds, tertiary amines and hindered amines are preferable.

The amount of the reaction terminator is not particularly limited as long as the amount is sufficient to deactivate the polymerization catalyst. The molar ratio thereof to the polymerization catalyst is usually in the range of $1.0 \times 10^{-1}$ to $1.0 \times 10^{1}$.

The molecular weight modifier is not particularly limited. Examples thereof include methylal, methoxymethylal, dimethoxymethylal, trimethoxymethylal and oxymethylene di-n-butyl ether. In particular, methylal is preferable. The amount of the molecular weight modifier is determined appropriately in accordance with the target molecular weight. The amount is usually controlled in the range of 0 to 0.1 mass % relative to all the monomers.

⟨Optional Components and Additional Components which May be Present in Polyacetal Copolymer (X)⟩

When carrying out the present invention, hindered phenol compounds, hindered amine compounds, amino-substituted triazine compounds, phosphorus stabilizers, and metal-containing compounds represented by the group consisting of hydroxides, fatty acid salts, inorganic acid salts or alkoxides of alkali metals and alkaline earth metals, may be added to the polyacetal copolymer (X) of the invention while still achieving the original objects. In the present specification, the "hindered phenol compounds, hindered amine compounds, amino-substituted triazine compounds, phosphorus stabilizers, and metal-containing compounds represented by the group consisting of hydroxides, fatty acid salts, inorganic acid salts or alkoxides of alkali metals and alkaline earth metals" described above are sometimes written as "optional components" hereinbelow. Such optional components may be conventional.

When carrying out the present invention, in addition to the optional components described above, various additives such as stabilizers, nucleating agents, release agents, fillers, pigments, dyes, lubricants, plasticizers, antistatic agents, oil agents, sizing agents, UV absorbers, flame retardants, flame retardant aids, antifungal agents and antiviral agents, as well as other resins, elastomers or the like may be added as required appropriately to the polyacetal copolymer (X) of the invention while still achieving the original objects. In the present specification, the "various additives such as stabilizers, nucleating agents, release agents, fillers, pigments, dyes, lubricants, plasticizers, antistatic agents, oil agents, sizing agents, UV absorbers, flame retardants, flame retardant aids, antifungal agents and antiviral agents, as well as other resins, elastomers or the like" are sometimes written as "additional components" hereinbelow. Examples of the fillers include mineral fillers and glass fibers such as glass fibers, glass flakes, glass beads, wollastonite, mica, talc, boron nitride, calcium carbonate, kaolin, silicon dioxide, clay, asbestos, silica, diatomaceous earth, graphite and molybdenum disulfide, inorganic fibers such as middle fibers, potassium titanate fibers and boron fibers, organic fibers represented by carbon fibers and aramid fibers, potassium titanate whisker, carbon black, and pigments.

The above-mentioned optional components and additional components may be added to the polyacetal copolymer (X) by any methods without limitation. For example, the polyacetal copolymer (X), and the optional components and/or the additional components which are added as required may be mixed and kneaded together in any order. The mixing and kneading conditions such as temperature and pressure may be selected appropriately from those conditions adopted in the production of conventional polyacetal copolymers. For example, the kneading may take place at or above the melting point of the polyacetal copolymer, and is preferably carried out at not less than 180° C. and not more than 260° C. The apparatus for the production of the polyacetal copolymer is not particularly limited and may be a mixer, a kneader or the like conventionally used for the production of this type of polyacetal copolymers. The above-mentioned optional components and additional components may be separately mixed with, caused to penetrate, adsorbed to or attached to the fiber containing the polyacetal copolymer (X).

⟨Use Applications of Antimicrobial Fibers⟩

The antimicrobial fiber of the invention can be fabricated into a nonwoven fabric, a woven fabric, a knitted fabric, a felt, a web or the like in accordance with the use application. To take advantage of its antimicrobial properties, a filter comprising such a nonwoven fabric is particularly suited. Such a nonwoven fabric, woven fabric, knitted fabric, felt and web have the same level of antimicrobial properties as the antimicrobial fiber of the invention, and have outstanding characteristic that antimicrobial properties persist even after repeated washing. Further, the inventive fibers do not suffer problems during fabrication in terms of heat resistance or discoloration and have excellent safety as compared to conventional antimicrobial fibers containing organic antimicrobial agents or inorganic antimicrobial agents, thus finding a wide range of suitable applications. In particular, the nonwoven fabrics of the present invention may be suitably used as filters. Such a filter has the same level of antimicrobial properties as the antimicrobial fiber of the invention, and has outstanding characteristic that antimicrobial properties persist even after repeated washing. The woven fabrics, the knitted fabrics, the felts and the webs of the present invention may be suitably used in applications including clothing articles such as underwear, shirts, sportswear, aprons, socks, stockings, tights, pantyhose, Japanese tabi socks, Japanese dress goods, neckties, handkerchiefs, scarves, headgears, gloves, masks and diapers, bedding articles such as pillow covers, blankets, sheets and futon or bed batting, interior articles such as curtains, carpets, mats, rugs, wall hangings, wall upholsteries, tablecloths and moquette, and miscellaneous goods such as towels, kitchen towels, scrub brushes, mops and batting in stuffed toys. These clothing articles, bedding articles, interior articles and miscellaneous goods also have the same level of antimicrobial properties as the antimicrobial fiber of the invention, and have outstanding characteristic that antimicrobial properties persist even after repeated washing.

While the antimicrobial fibers of the invention alone may be fabricated into products such as nonwoven fabrics, woven fabrics, knitted fabrics, felts and webs, the antimicrobial fibers of the invention may be conjugated with synthetic fibers such as nylons, polyesters and polyurethanes, natural fibers such as cotton and silk, carbon fibers, glass fibers or the like so as to form twisted yarns, covered yarns or braids which are then fabricated into products such as nonwoven fabrics, woven fabrics, knitted fabrics, felts and webs. Alternatively, the inventive fibers may be mixed or mix-spun with synthetic fibers such as nylons, polyesters and polyurethanes, natural fibers such as cotton and silk, carbon fibers or glass fibers and may be fabricated into products such as nonwoven fabrics, woven fabrics, knitted fabrics, felts and webs. The inventive antimicrobial fibers or products such as woven fabrics or knitted fabrics fabricated in accordance with use applications may be further subjected to dyeing and various finish treatments (such as crease resistant treatment, antifouling, flame retarding, mothproofing, mildew proofing, deodorization, hygroscopic treatment, waterproofing, lustering and anti-pilling) to impart functions other than antimicrobial properties.

The antimicrobial nonwoven fabric of the invention may be produced by any method without limitation. A known method such as a dry process, a wet process, a spunbonding process or a meltblowing process may be used. During the process, it is preferable that the fibers be sufficiently bonded or entangled together to prevent detachment of the fibers. Examples of such methods include thermal bonding, chemical bonding, needle punching, spunlacing (waterjet entangling), stitch bonding and steam jetting. In particular, thermal bonding can achieve sufficient bonding and is thus preferable.

The polyacetal copolymer (X) may be used also in a frame member that supports the above nonwoven fabric filter. In this manner, the product attains excellent antimicrobial properties and recycling properties.

EXAMPLES

Hereinbelow, embodiments and advantageous effects of the present invention will be described in detail by presenting Examples and Comparative Examples. The scope of the invention is not limited to such Examples.

⟨Polyacetal Copolymers⟩

The polyacetal copolymers used in Examples and Comparative Examples are described below. The content of oxyethylene groups (the molar amount of oxyethylene groups) in the polyacetal copolymer (X) is a value relative to the total of the molar amount of oxymethylene groups and the molar amount of oxyethylene groups.

POM-1: polyacetal copolymer having a content of oxyethylene groups of 0.4 mol % and an MVR of 8
POM-2: polyacetal copolymer having a content of oxyethylene groups of 1.6 mol % and an MVR of 8
POM-3: polyacetal copolymer having a content of oxyethylene groups of 3.0 mol % and an MVR of 8
POM-4: polyacetal copolymer having a content of oxyethylene groups of 4.7 mol % and an MVR of 8
POM-5: polyacetal copolymer having a content of oxyethylene groups of 5.7 mol % and an MVR of 8

⟨Other Thermoplastic Resins⟩

PLA (polylactic acid resin): TERRAMAC (registered trademark) TE2000 manufactured by UNITIKA LTD. was used as such.
PET (polyethylene terephthalate resin): multifilaments having a monofilament fineness of 2 decitex were used as such.

⟨Measurement of MVR⟩

The MVR ($cm^3$/10 min) of the polyacetal copolymers was measured in accordance with ISO 1133.

⟨Measurement of Content of Oxyethylene Groups in Polyacetal Copolymers⟩

The polyacetal copolymers used in Examples and Comparative Examples were each dissolved into hexafluoroisopropanol (d2) to give NMR measurement samples. The measurement samples were analyzed to record NMR spectra, from which the contents of oxyethylene groups in the polyacetal copolymers were measured.

⟨Measurement of Fiber Fineness⟩

To determine the fiber fineness [dtex (decitex)], the fiber diameter of a monofilament was measured using an optical microscope, and the fineness was calculated assuming that the density was 1.40 $g/cm^3$. The average of fifty fibers was obtained as the fiber fineness.

⟨Measurement of Orientation Factor fc (%) of Fibers⟩

The measurement was performed with a wide angle X-ray diffractometer (DP-D1 manufactured by Shimadzu Corporation), using CuKα (a Ni filter was used) as the radiation source (output 45 KV, 40 mA). The orientation factor (fc) was determined with respect to (100) plane observed at near 2θ=22.2° using the equation (1) below wherein FWHM was the full-width at half-maximum (°) of a diffraction intensity distribution curve (an azimuthal distribution curve) obtained by scanning in the circumferential direction.

$$fc\ (\%)=((180°-FWHM)/180°)\times100 \qquad \text{Equation (1)}$$

⟨Fabrication of Fiber Samples⟩

The temperature of a cylinder and a nozzle portion was increased to 200° C. A molten resin was ejected through a nozzle having 48 holes 0.6 mm in diameter, at a rate of 1.2 kg/h. In the case of sheath-core conjugate fibers, the rate of ejection from the nozzle was 0.6 kg/h for each of the resin for the core and the resin for the sheath. During the process, the as-ejected fibers were continuously collected at a constant take-off speed of 100 m/min, and the as-ejected fibers were subsequently guided to a thermal drawing step in which the fibers were drawn at a roll temperature of 120 to 140° C. A fiber sample was thus fabricated.

⟨Fabrication of Nonwoven Fabrics and Filters⟩

The drawn fibers obtained above were crimped and were cut to a length of 51 mm. The fibers were then formed into a web with a carding machine (manufactured by Kyowa Kizai Seisakusho) and were entangled with a needle punching machine (manufactured by Daiwa Kikou) into a needle punched nonwoven fabric.

⟨Antimicrobial Test (Bacteriostatic Activity, Bactericidal Activity, Retention of Bacteriostatic Activity after 10 Times of Washing, and Retention of Bactericidal Activity after 10 Times of Washing)⟩

In accordance with JIS L 1902 (Testing for antibacterial activity and efficacy on textile products), the antimicrobial properties were evaluated by a quantitative test (a bacterial liquid absorption method). A fiber sample of standard cotton cloth, and a fiber sample of any of Examples and Comparative Examples (hereinafter, written as the measurement sample), each weighing 0.4 g, were placed into respective vial containers and were inoculated with 0.2 ml of a test bacterial liquid. The bacteria were cultured at 37±2° C. for 18±1 hours. The bacteria were then washed out from the samples by the addition of 20 ml of physiological saline containing 0.2% nonionic surfactant. The bacterial count in the spent washing liquid was measured by a pour plate culture method (a colony method), and the bacteriostatic activity was calculated using the equation (2) below. The larger the value of bacteriostatic activity, the more excellent the antimicrobial properties. Incidentally, 2.2 or higher bacteriostatic activity on *Staphylococcus aureus* corresponds to the SEK mark (blue: antimicrobial and deodorant finished) certified by Japan Textile Evaluation Technology Council. Further, the bactericidal activity was calculated using the equation (3) below. The larger the value of bactericidal activity, the more excellent the antimicrobial properties. More than 0 activity means that bacteria are reduced in number between before and after the antimicrobial test.

Bacteriostatic activity={log(viable bacterial count after culture in standard cotton cloth)–log(viable bacterial count immediately after inoculation on standard cotton cloth)}–{log(viable bacterial count after culture in measurement sample)–log(viable bacterial count immediately after inoculation on measurement sample)}   Equation (2)

Bactericidal activity=log(viable bacterial count immediately after inoculation on standard cotton cloth)–log(viable bacterial count after culture in measurement sample)   Equation (3)

The retentions of bacteriostatic activity and bactericidal activity after 10 times of washing were determined in the following manner. The washing method was in conformity with JIS L 0217, No. 103, and the detergent was JAFET standard detergent. After being washed repeatedly 10 times, the samples were subjected to the above antimicrobial testing, and the retention [unit: %] of bacteriostatic activity after 10 times of washing was calculated using the equation (4) below. Further, the retention [unit: %] of bactericidal activity after 10 times of washing was calculated using the equation (5) below. In each case, the closer the value to 100%, the higher the antimicrobial properties.

Retention of bacteriostatic activity (%)=(bacteriostatic activity after 10 times of washing/bacteriostatic activity before washing treatment)×100   Equation (4)

Retention of bactericidal activity (%)=(bactericidal activity after 10 times of washing/bactericidal activity before washing treatment)×100   Equation (5)

The bacteriostatic activity, the bactericidal activity, and the retentions of bacteriostatic activity and bactericidal activity after 10 times of washing were measured on *Staphylococcus aureus* and *Moraxella osloensis*.

⟨Examples and Comparative Examples⟩

Table 1 shows Examples of monolayer fibers of a polyacetal copolymer having an oxyethylene content in the prescribed range, multilayer fibers of polyacetal copolymers having an oxyethylene content in the prescribed range, and multilayer fibers of PLA and a polyacetal copolymer having an oxyethylene content in the prescribed range, and Comparative Examples of polyester fibers and monolayer fibers of a polyacetal copolymer having an oxyethylene content exceeding the prescribed range.

The table describes the oxyethylene content in the polyacetal copolymer, the monofilament fineness, the orientation factor, the viable bacterial count (unit: colonies) after culture in the aforementioned antimicrobial test, the increase ratio before and after the antimicrobial test, the bacteriostatic activity, the retention of bacteriostatic activity after 10 times of washing, the bactericidal activity, and the retention of bactericidal activity after 10 times of washing obtained in each of Examples and Comparative Examples.

From Examples 1 to 6 and Comparative Examples 1 and 2, it has been shown that excellent bacteriostatic activity, bactericidal activity and retention of bactericidal activity after washing are attained when the oxyethylene content in the polyacetal copolymer is 0.2 to 5 mol %. Examples 4 to 6 show that the bacteriostatic activity, the bactericidal activity and the retention of bactericidal activity after washing are further enhanced when the polyacetal copolymer in the fibers has a high orientation factor.

TABLE 1

| Raw materials of fibers | | Ex. 1 POM-1 | Ex. 2 POM-2 | Ex. 3 POM-3 | Ex. 4 POM-4 | Ex. 5 POM-4 |
|---|---|---|---|---|---|---|
| Oxyethylene content in polyacetal copolymer [mol %] | | 0.4 | 1.6 | 3.0 | 4.7 | 4.7 |
| Melting point of polyacetal copolymer [° C.] | | 170 | 166 | 160 | 155 | 155 |
| Draw temperature [° C.] | | 140 | 135 | 130 | 125 | 125 |
| Draw ratio | | 5.2 | 5.2 | 5.2 | 5.2 | 8.3 |
| Monofilament fineness [dtex] | | 8 | 8 | 8 | 8 | 5 |
| Orientation factor of fibers [%] | | 87 | 84 | 84 | 82 | 93 |
| Addition of antimicrobial agent | | No | No | No | No | No |
| Antimicrobial test | *Staphylococcus aureus* Viable bacterial count after culture [colonies] | 1.00.E+04 | 1.58.E+04 | 3.16.E+04 | 3.98.E+04 | 2.51.E+04 |
| | Increase ratio(*3) before and after antimicrobial test | 0.5 | 0.8 | 1.6 | 2.0 | 1.3 |
| | Bacteriostatic activity(*1) | 2.9(2.9) | 2.7 | 2.4 | 2.3 | 2.5 |
| | Retention of bacteriostatic activity after 10 times of washing [%](*1) | 100(100) | 100 | 100 | 99 | 100 |
| | Antimicrobial and deodorant finished certification(*2) | ○ | ○ | ○ | ○ | ○ |
| | Bactericidal activity(*1) | 0.3(0.3) | 0.1 | −0.2 | −0.3 | −0.1 |
| | Retention of bactericidal activity after 10 times of washing(*1) | 100(100) | 100 | 100 | 97 | 100 |

TABLE 1-continued

| | | | | | | | |
|---|---|---|---|---|---|---|---|
| *Moraxella osloensis* | Viable bacterial count after culture [colonies] | 1.00.E+05 | 1.26.E+05 | 1.58.E+05 | 2.00.E+05 | 2.00.E+05 | |
| | Increase ratio(*3) before and after antimicrobial test | 5.0 | 6.3 | 7.9 | 10.0 | 10.0 | |
| | Bacteriostatic activity(*1) | 2.3(2.3) | 2.2 | 2.1 | 2.0 | 2.0 | |
| | Retention of bacteriostatic activity after 10 times of washing [%](*1) | 100(100) | 100 | 100 | 99 | 100 | |
| | Bactericidal activity(*1) | −0.7(−0.7) | −0.8 | −0.9 | −1.0 | −1.0 | |
| | Retention of bactericidal activity after 10 times of washing(*1) | 100(100) | 100 | 100 | 91 | 97 | |

| Raw materials of fibers | | Ex. 6 POM-4 | Ex. 7 POM-1 (core)/ POM-4 (sheath) | Ex. 8 PLA (core)/ POM-4 (sheath) | Comp. Ex. 1 PET | Comp. Ex. 2 POM-5 |
|---|---|---|---|---|---|---|
| Oxyethylene content in polyacetal copolymer [mol %] | | 4.7 | 0.4/4.7 | —/4.7 | — | 5.7 |
| Melting point of polyacetal copolymer [° C.] | | 155 | 170/155 | —/155 | — | 147 |
| Draw temperature [° C.] | | 125 | 130 | 130 | — | 125 |
| Draw ratio | | — | 5.2 | 5.2 | — | — |
| Monofilament fineness [dtex] | | 42 | 8 | 8 | 2 | 42 |
| Orientation factor of fibers [%] | | 63 | 85 | 84 | — | 72 |
| Addition of antimicrobial agent | | No | No | No | No | No |
| Antimicrobial test | *Staphylococcus aureus* | | | | | |
| | Viable bacterial count after culture [colonies] | 5.01.E+04 | 3.16.E+04 | 3.16.E+04 | — | 7.94.E+04 |
| | Increase ratio(*3) before and after antimicrobial test | 2.5 | 1.6 | 1.6 | — | 4.0 |
| | Bacteriostatic activity(*1) | 2.2 | 2.4 | 2.4 | 0.6 | 2.0 |
| | Retention of bacteriostatic activity after 10 times of washing [%](*1) | 92 | 99 | 98 | 93 | 82 |
| | Antimicrobial and deodorant finished certification(*2) | ○ | ○ | ○ | x | x |
| | Bactericidal activity(*1) | −0.4 | −0.2 | −0.2 | — | −0.6 |
| | Retention of bactericidal activity after 10 times of washing(*1) | 91 | 100 | 100 | — | 89 |
| | *Moraxella osloensis* | | | | | |
| | Viable bacterial count after culture [colonies] | 3.16.E+05 | 2.00.E+05 | 2.00.E+05 | — | 6.31.E+05 |
| | Increase ratio(*3) before and after antimicrobial test | 15.8 | 10.0 | 10.0 | — | 31.6 |
| | Bacteriostatic activity(*1) | 1.8 | 2.0 | 2.0 | 0.7 | 1.5 |
| | Retention of bacteriostatic activity after 10 times of washing [%](*1) | 89 | 99 | 98 | 91 | 83 |
| | Bactericidal activity(*1) | −1.2 | −1.0 | −1.0 | — | −1.5 |

TABLE 1-continued

| | | | | | |
|---|---|---|---|---|---|
| Retention of bactericidal activity after 10 times of washing(*1) | 88 | 98 | 97 | — | 81 |

(*1): The numbers in parenthesis indicate results of evaluation as nonwoven fabrics. The numbers without parenthesis indicate results of fiber samples simply bundled.
(*2): o and x indicate that the product corresponded and did not correspond, respectively, to the SEK mark (blue: antimicrobial and deodorant finished) certified by Japan Textile Evaluation Technology Council.
(*3): Increase ratio before and after antimicrobial test = viable bacterial count after culture/viable bacterial count immediately after inoculation
Bacteriostatic activity = {log(viable bacterial count after culture in standard cotton cloth) − log(viable bacterial count immediately after inoculation on standard cotton cloth)} − {log(viable bacterial count after culture in measurement sample) − log(viable bacterial count immediately after inoculation on measurement sample)} Bactericidal activity = log(viable bacterial count immediately after inoculation on standard cotton cloth) − log(viable bacterial count after culture in measurement sample)

The invention claimed is:

1. A method of manufacturing an antimicrobial fiber for *Staphylococcus aureus* and *Moraxella osloensis*, comprising the steps of melt-spinning pellets of a polyacetal copolymer (X), the polyacetal copolymer (X) having oxymethylene groups and oxyalkylene groups of the following general formula (1), a molar amount of the oxyalkylene groups in the polyacetal copolymer (X) being 0.2 to 1.6 mol % relative to a total of a molar amount of the oxymethylene groups and the molar amount of the oxyalkylene groups,

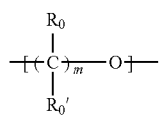

(1)

wherein $R_0$ and $R_0'$, which may be the same as or different from each other, are each selected from a hydrogen atom, a $C_{1-8}$ alkyl group, an organic group having a $C_{1-8}$ alkyl group, a phenyl group and an organic group having a phenyl group, and m is an integer of 2 to 6, optionally with pellets of a thermoplastic resin other than the polyacetal copolymer (X), so as to obtain a fiber having the polyacetal copolymer (X) on a surface; and drawing the fiber at a draw ratio of 3 to 15 times so that the polyacetal copolymer (X) is maintained on the surface of the fiber, to obtain the antimicrobial fiber;
wherein the step of drawing the fiber is performed so that orientation factor of the polyacetal copolymer (X) is not less than 60%.

2. The method according to claim 1, wherein the fiber having the polyacetal copolymer (X) on a surface thereof is a monolayer fiber of the polyacetal copolymer (X).

3. The method according to claim 1, wherein the fiber having the polyacetal copolymer (X) on a surface thereof is a multilayer fiber having a coating of the polyacetal copolymer (X) on a fiber including a thermoplastic resin.

4. The method according to claim 1, wherein the fiber having the polyacetal copolymer (X) on a surface thereof is a conjugate fiber having the polyacetal copolymer (X) on a surface of a fiber including a thermoplastic resin.

5. The method according to claim 3, wherein the thermoplastic resin is one or more selected from polyacetal homopolymers, polyacetal copolymers other than the polyacetal copolymer (X), polyolefin resins, polylactic acid resins, nylon resins, polyester resins, polyvinyl resins and elastomers of these resins.

6. A method of manufacturing an antimicrobial nonwoven fabric comprising the step of fabricating the antimicrobial fiber manufactured according to claim 1, into the nonwoven fabric.

7. A method of manufacturing an antimicrobial filter comprising the step of fabricating the antimicrobial nonwoven fabric manufactured according to claim 6, into the filter.

8. A method of manufacturing an antimicrobial knitted fabric comprising the step of fabricating the antimicrobial fiber manufactured according to claim 1, into the knitted fabric.

9. A method of manufacturing an antimicrobial woven fabric comprising the step of fabricating the antimicrobial fiber manufactured according to claim 1, into the woven fabric.

10. A method of manufacturing an antimicrobial felt comprising the step of fabricating the antimicrobial fiber manufactured according to claim 1, into the felt.

11. A method of manufacturing an antimicrobial web comprising the step of fabricating the antimicrobial fiber manufactured according to claim 1, into the web.

12. A method of manufacturing an antimicrobial clothing article comprising the step of fabricating the antimicrobial knitted fabrics manufactured according to claim 8, into the clothing article.

13. A method of manufacturing an antimicrobial bedding article comprising the step of fabricating the antimicrobial knitted fabrics manufactured according to claim 8, into the bedding article.

14. A method of manufacturing an antimicrobial interior article comprising the step of fabricating the antimicrobial knitted fabrics manufactured according to claim 8, into the interior article.

15. A method of manufacturing an antimicrobial clothing article comprising the step of fabricating the antimicrobial woven fabric manufactured according to claim 9, into the clothing article.

16. A method of manufacturing an antimicrobial bedding article comprising the step of fabricating the antimicrobial woven fabric manufactured according to claim 9, into the bedding article.

17. A method of manufacturing an antimicrobial interior article comprising the step of fabricating the antimicrobial woven fabric manufactured according to claim 9, into the interior article.

18. A method of manufacturing an antimicrobial clothing article comprising the step of fabricating the antimicrobial felt manufactured according to claim 10, into the clothing article.

19. A method of manufacturing an antimicrobial bedding article comprising the step of fabricating the antimicrobial felt manufactured according to claim 10, into the bedding article.

* * * * *